(12) United States Patent
Cawse

(10) Patent No.: US 8,501,309 B2
(45) Date of Patent: Aug. 6, 2013

(54) FIBRE REINFORCED ASSEMBLY

(75) Inventor: John Cawse, West Wratting (GB)

(73) Assignee: Hexcel Composites Limited, Duxford (GB)

( * ) Notice: Subject to any disclaimer, the term of this patent is extended or adjusted under 35 U.S.C. 154(b) by 1162 days.

(21) Appl. No.: 11/664,974

(22) PCT Filed: Sep. 8, 2005

(86) PCT No.: PCT/GB2005/003450
§ 371 (c)(1),
(2), (4) Date: Apr. 9, 2007

(87) PCT Pub. No.: WO2006/043019
PCT Pub. Date: Apr. 27, 2006

(65) Prior Publication Data
US 2009/0202809 A1 Aug. 13, 2009

(30) Foreign Application Priority Data
Oct. 21, 2004 (GB) .................................. 0423349.0

(51) Int. Cl.
*B32B 27/38* (2006.01)
*B32B 5/16* (2006.01)
*B32B 5/28* (2006.01)
*B32B 5/32* (2006.01)
*B32B 27/04* (2006.01)
*B05D 1/34* (2006.01)
*B05D 3/00* (2006.01)
*C08L 63/00* (2006.01)

(52) U.S. Cl.
USPC ........ 428/301.4; 427/189; 427/195; 427/201; 427/209; 427/386; 427/389.9; 428/297.4; 428/297.7; 428/300.7; 428/413

(58) Field of Classification Search
None
See application file for complete search history.

(56) References Cited

U.S. PATENT DOCUMENTS

| 3,214,324 | A | * | 10/1965 | Peerman ........................ 442/85 |
| 3,305,417 | A | * | 2/1967 | Christie ......................... 156/90 |
| 3,625,918 | A | * | 12/1971 | Heer et al. .................... 528/122 |
| 3,666,615 | A |  | 5/1972 | Iwai et al. |
| 3,723,223 | A | * | 3/1973 | Le Compte ................... 156/313 |
| 4,500,660 | A |  | 2/1985 | Minamisawa et al. |
| 5,084,521 | A |  | 1/1992 | White |
| 5,166,229 | A |  | 11/1992 | Nakano et al. |
| 5,480,957 | A | * | 1/1996 | Muroi et al. .................... 528/87 |
| 5,907,020 | A | * | 5/1999 | Correll et al. ................. 525/526 |
| 5,952,435 | A |  | 9/1999 | Chiba et al. |
| 6,165,558 | A | * | 12/2000 | Schneider ..................... 427/386 |
| 6,329,473 | B1 | * | 12/2001 | Marten et al. ................. 525/438 |
| 2004/0087229 | A1 | * | 5/2004 | Kalbe et al. ................... 442/149 |
| 2005/0092237 | A1 | * | 5/2005 | Daniels ........................ 118/308 |

FOREIGN PATENT DOCUMENTS

| EP | 0431333 A1 | 6/1991 |
| EP | 1300507 A2 | 4/2003 |
| EP | 1338406 A2 | 8/2003 |
| GB | 1477642 | 6/1997 |
| WO | 97/24398 | 7/1997 |

OTHER PUBLICATIONS

Terech P. et al. "Low Molecular Mass Gelators of Organic Liquids and the Properties of Their Gels", Chemical Reviews, ACS, Easton, US, vol. 97, 1997, pp. 3133-3159.
European Patent Office—Patent Abstracts of Japan—Publication No. 57172930, Nitto Electric Ind. Co. Ltd.—published Oct. 25, 1982.
Terech P. et al., "Low Molecular Mass Gelators of Organic Liquids and the Properties of Their Gels", Chemical Revieww, ACS. Easton, US. Bol. 97, 1997, pp. 3133-3159.

* cited by examiner

*Primary Examiner* — Michael J Feely
(74) *Attorney, Agent, or Firm* — W. Mark Bielawski; David J. Oldenkamp

(57) ABSTRACT

An uncured assembly which comprises a fibrous reinforcement. Associated with said reinforcement is a resin material comprising at least one solid amine-terminated epoxy resin, at least one solid epoxy-terminated epoxy resin and optionally at least one cure catalyst.

16 Claims, 2 Drawing Sheets

FIBRE REINFORCED ASSEMBLY

The present invention relates to a fibre reinforced assembly comprising at least one epoxy resin.

Fibre reinforced assemblies, for example prepregs, are used in many industrial applications because of convenient handling and efficiency compared to the alternative wet lay-up technology. Industrial users of such assemblies tend to demand ever-faster cycle times and lower, more energy efficient curing temperatures. These users still require the prepregs to have long out-life.

It has been a long standing requirement to produce a low temperature cure, low tack epoxy fibre reinforced assembly. A cure schedule of 15 minutes at 90° C. is a typical target. This allows the cure schedule to be performed in a mould that is heated only by hot water. Such a target is readily achieved by wet lay-up approaches, by the use of two-part systems that are mixed together immediately prior to use. However, attempts to translate this type of resin chemistry into a fibre reinforced assembly format have failed. The reason for this is that, for practical purposes, the desired rate of cure can be achieved only by the use of aliphatic amine curing agents and these are invariably mobile liquids at room temperature. These types of amines also tend to react with carbon dioxide in the atmosphere, leading to carbamation and subsequent deactivation. Many of these amines, even those few that are low melting solids, additionally possess very objectionable odours.

Many traditional types of epoxy curing agent are found to be unsatisfactory for this type of application. Imidazoles are insufficiently active. Thermal cationic cure is capable of initiating the epoxy polymerisation, and rapid cure can be achieved in this way, but the curing agents are expensive and are deactivated by the presence of polar sizings on the fibrous reinforcement. Another problem often encountered is that the catalyst systems used may give rise to undesirable orange or brown colours in the cured laminate.

Manufacturers using fibre reinforced assemblies, in particular prepregs, in automated lay-up applications often have difficulties with cutting the assembly. Prepregs, in particular, are usually tacky because of the resinous nature of their chemical components. The cutting blades easily become coated with tacky deposits and this necessitates stopping the production line to clean the blades. A non-tacky prepreg would be ideal in such cases, but once again the liquid nature of the chemical components precludes this.

Therefore, it is an object of the present invention to provide a substantially tack-free, rapid curing reinforced epoxy resin fibre reinforced assembly having a good out-life.

According to the present invention there is provided an uncured assembly comprising a fibrous reinforcement having associated therewith a resin material comprising at least one solid amine-terminated epoxy resin, at least one solid epoxy-terminated epoxy resin and optionally at least one cure catalyst.

As referred to herein the term cure catalyst is also intended to encompass cure accelerators.

The assembly may be in the form of a prepreg or a pre-form assembly suitable for liquid resin infusion processes such a Resin Transfer Molding (RTM) and Vacuum-assisted Resin Transfer Molding (VaRTM). Preferably the pre-form assembly comprises a fibrous material.

Advantageously, the assembly of the present invention is such that the components of the assembly readily react together at 90° C. to provide a cured, colourless laminate with a Tg of 90° C. or more.

Furthermore, the assembly of the present invention has been shown to have a good out-life. Assemblies have been stored for up to four weeks at ambient temperature without any detriment to performance.

An important aspect of the present invention is the preparation of the amine-terminated epoxy resins. The amine-terminated solid epoxy resins are prepared by the reaction of a suitable amino compound with a suitable epoxy-resin. Following the reaction, the ensuing resinous melt is cooled, and ground to form a powder hereinafter referred to as a first stage powder.

Typically, the reaction mixture is ground by mechanical means including cryo-grinding and then the ground material sieved or otherwise categorised to produce a fine powder. A typical particle size is in the range from 1 to 300 µm and preferably in the range from 1 to 150 µm. Thus, the amine-terminated epoxy resin is preferably present in a powdered form.

The epoxy-terminated epoxy resin may comprise at least one epoxy resin which is used in fibre reinforced assemblies. Such resins are so blended so as to produce a resin that is solid at room temperature and which forms a suitably mobile liquid at the target cure temperature. Such blending would be readily performed by one skilled in the art. Preferably, the epoxy-terminated epoxy resin is then powdered.

As referred to herein room/ambient temperature is taken to be 20-25° C.

The amine-terminated solid epoxy resin is preferably terminated by a primary or secondary aliphatic amino group and mixtures thereof.

When selecting suitable amino groups consideration should be given to the nature of the epoxy resin. It is important to select an amine that will not form a cross-linked gel when it is reacted with the epoxy in the preparation of the first stage powders.

Alternatively, a large molar excess of amine can be used and, following reaction, unreacted amine can be removed by distillation. The reaction can be carried out in bulk state or in a suitable solvent which is subsequently removed.

Suitable commercially available amines for the amine-terminated epoxy resin may be selected from any of the following either alone or in combination: ammonia, dimethylamine, diethylamine, dipropylamine, diethylenetriamine, piperazine, 1-(2-aminoethyl)piperazine, bis(aminopropyl) piperazine, 1-(3-aminopropyl)-2-pipecoline, 4-(2-aminoethyl)morpholine, cyclohexylamine, 3-aminobenzylamine and the like.

Preferably, the amine compound will be difunctional (i.e. have two active hydrogens) or comprise two amino groups with significantly different reactivity.

One skilled in the art will be well aware of the points to be considered when selecting a suitable amine compound.

Preferably, the epoxy resins for the preparation of the amine-terminated epoxy resin are bifunctional.

Suitable commercially available epoxy resins for the preparation of the amine-terminated epoxy resin may be selected from any of the following either alone or in combination: diglycidyl ether of Bisphenol A, the diglycidyl ether of Bisphenol F, resorcinol diglycidyl ether, the diglycidyl ester of phthalic acid, naphthalene 1,6-diol diglycidyl ether, tetramethyl biphenol diglycidyl ether, the diglycidyl ether of bromine substituted Bisphenol A.

The said amine-terminated epoxy resin component preferably constitutes from 10 to 90% w/w and more preferably from 30 to 70% w/w of the total resin material.

Suitable commercially available epoxy resins for use as the epoxy-terminated solid epoxy resin may be selected from any of the following either alone or in combination: the epoxy resins referred to above and epoxy phenol novolak, epoxy cresol novolak, solid epoxy resins based on Bisphenol A, the tetraglycidyl ether of tetrakis(hydroxyphenyl)ethane, the triglycidyl ether of tris(hydroxyphenyl)methane, the polyglycidyl ether of the reaction product between dicyclopentadiene and phenol and other solid difunctional and polyfunctional epoxy resins well known to those practised in the art.

The said epoxy-terminated epoxy resin component preferably constitutes from 90 to 10% w/w and more preferably from 70 to 30% w/w of the total resin material.

When selecting suitable epoxy resins both for the amine-terminated epoxy resin and the epoxy-terminated epoxy resin consideration should be given to the thermal properties of the resins. It is essential that the amine-terminated epoxy resin, once prepared, and the epoxy-terminated epoxy resin are able to melt and flow at the cure temperature of the assembly. Furthermore, both epoxy resin types must be capable of being ground to a powder when cold.

Cure accelerators or catalysts, where included, may be selected from any of the following either alone or in combination: tris(dimethylaminomethyl) phenol, dimethylaminomethylphenol, phenol, catechol, resorcinol, pentadecyl phenol, diuron, phenyl urea, Bisphenol A and salicylic acid.

Accelerators or catalysts preferably constitute from 0 to 10 and more preferably from 0 to 5% w/w of the total resin material.

Accelerators or catalysts may be added to either the epoxy-terminated epoxy resin resinous melt or the amine terminated epoxy resin resinous melt. Therefore, when the melt is cooled and ground the catalyst is comprised within the powdered resin.

Other components such as wetting agents or dispersants e.g. BYK-R605, BYK-A525 and BYK-A560 from BYK-Chemie of Wesel, Germany; fire retardants such as Antiblaze® from Albright and Wilson, West Midlands, England; intumescents such as the Exolit® range from Clariant Specialties Ltd, Middlesex, England; pigments and dyes from Ciba Specialty Chemicals, Basel, Switzerland may be included in the first stage powdered resins in a similar fashion.

Surprisingly, it has been found that when bisphenol A and/or salicylic acid are added to the amine-terminated epoxy resin resinous melt the ensuing powder is very free flowing and has no tendency to clump at room temperature relative to powders prepared in their absence.

The fibrous reinforcement may comprise an organic or inorganic fibre. Suitable reinforcements for use in the present invention include carbon, glass, aramid (aromatic polyamide), polyethylene, ceramic, natural fibres such as kenaf, hemp and cellulose, but the invention is particularly appropriate for fibreglass and carbon fibres.

Hybrid or mixed fibre systems may also be envisaged. The use of cracked (i.e. stretch-broken) or selectively discontinuous fibres may be advantageous to facilitate lay-up of the product according to the invention and improve its capability of being shaped.

The surface mass of fibres within the fibrous reinforcement is generally 80-4000 $g/m^2$, preferably 100-2500 $g/m^2$, and especially preferably 150-2000 $g/m^2$. The number of carbon filaments can vary from 3000 to 320,000, again preferably from 6,000 to 24,000. For fibreglass reinforcements, fibres of 600-2400 tex are particularly adapted.

The fibres may be utilised in unidirectional form, or as non-woven mats, woven fabrics, multi-axial fabrics or non-crimped fabrics. Combinations of those reinforcement forms may also be utilized.

The epoxy resins of the present invention may be loaded onto the fibrous web in quantities such that the final total loading of both the amine-terminated epoxy resin and the epoxy-terminated epoxy resin together is in the range of 20-50%, more preferably 30-40%, of the total weight of the assembly comprising resin, plus reinforcement.

Where the assembly is an unimpregnated preform the resin material for infusion i.e. resin and catalyst are mixed immediately prior to their injection into a closed mould containing the fibrous reinforcement. The fibrous reinforcement may be preloaded with powdered resin components and, optionally, other suitable materials such as binders.

Typically, for such RTM and VaRTM systems, low viscosity particulate free resins are necessary in order to achieve satisfactory infusion. Clearly, this limits the choice of resin material which can be used in such systems.

Surprisingly, the present invention overcomes this problem by allowing the solid resin component to be incorporated via the reinforcement and also dramatically increases the pot life of the infusion resin system.

Where the assembly of the present invention is in the form of a prepreg the components of the resin material may be combined prior to their application to the fibrous reinforcement such that all the components are applied in one process step. Alternatively, the resin material may be applied to the fibrous reinforcement in sequential layers, for example a first layer may comprise an amine-terminated epoxy resin and a second layer applied to the first layer may comprise an epoxy-terminated epoxy resin. The additional components may be present in the first and/or second layers or may be included in the assembly as further layers. Where the resin material is applied in sequential layers there may be a plurality of layers comprising an amine-terminated epoxy resin and a plurality of layers comprising an epoxy-terminated epoxy resin.

The resin material may be associated with the fibrous reinforcement in several ways.

For example, the resin material may be deposited on at least one side of the fibrous reinforcement. In this case, the resin may form a coating on at least one surface of the reinforcement or it may be such that a layer of resin material is formed within a peripheral region of the reinforcement. By peripheral region it is meant the outermost regions of the reinforcement which lie immediately beneath the outer surfaces of the reinforcement.

The resin material may also be applied to the fibrous reinforcement in such a way that the resin material becomes dispersed throughout the bulk of the reinforcement. Typically, such dispersal is achieved by the action of a vacuum and/or pressure upon the assembly.

The resin material may be deposited/dispersed uniformly to form a continuous coating/layer or it may be deposited so as to form a discontinuous pattern. The resin may also be deposited/dispersed in order that regions of the fibrous reinforcement have a greater or lesser loading weight in order to improve the flexibility and drapeability of the assembly.

Thus, according to a second aspect of the present invention there is provided a method for the preparation of an uncured fibre reinforced assembly as described herein comprising the steps of: preparing a powdered amine-terminated epoxy resin, preparing a powdered epoxy-terminated epoxy resin, optionally combining the said resins, applying the resins to a fibrous reinforcement so as to form a resin material.

According to a further aspect of the present invention there is provided a method for curing the uncured assembly as hereinbefore described comprising the step of: heating the uncured assembly at a temperature of 70 to 120° C. for 1 to 60 minutes.

In a first and preferred embodiment of the present invention there is provided, a reinforcement and a powdered resin material deposited therein or thereon, in which the resin material comprises a mixture of at least one solid, finely divided amine-terminated epoxy resin and at least one solid, finely divided epoxy-terminated epoxy resin and optionally other components such as an accelerator or catalyst for the epoxy-amine reaction, wetting agents, fire retardants, pigments, dyes and the like.

In the preferred embodiment, the powdered amine-terminated epoxy and the powdered epoxy are blended together in the correct ratio and then applied to a fibrous reinforcement in a manner described above. Once applied, the powdered layer is very briefly subjected to light pressure and or heat in order to sinter the particles of powder together, thereby causing the particles to adhere to the fabric and to each other without causing extensive flow of the amine and epoxy solids. The heat may be applied through a heated plate or roller or via radiative sources for example infrared or microwave.

In this form, the assembly now consists of a powder coated fabric material that is essentially tack-free. The particulate, solid nature of the components prevents significant advancement of the epoxy/amine reaction at room temperature. When heated to the cure temperature, however, the resinous components melt and, under the influence of applied pressure from a mould or press, mix intimately within the fibrous reinforcement. Good mixing is promoted by the fact that both the resins are in a finely divided form and are pre-mixed before application to the reinforcement. The formulations of this invention also exhibit good adhesion to aluminium and other substrates, unlike some other rapidly cured epoxies.

In a second embodiment, the invention comprises a reinforcement having deposited therein or thereon a resin material comprising a first layer which itself comprises at least one solid, finely divided epoxy-terminated epoxy resin in powder form and a second layer applied to the first layer comprising at least one solid amine-terminated epoxy resin. Optionally, additional components such as a catalyst for the epoxy-amine reaction, wetting agents, fire retardants, pigments, dyes may be included in the resin material. The additional components may be contained within either of the said first and second layers or may be included as further separate layers.

To provide the necessary degree of reactivity, the solid amine-terminated epoxy is formed from the reaction between a stoichiometric excess of an aliphatic or alicyclic amine and one or more epoxy resins. Thus is obtained an oligomeric amine/epoxy reaction product in an amorphous resinous form. By correct choice of the stoichiometry and starting materials, the resin is a solid at room temperature, becoming a mobile resin at the target cure temperature. There may be included in this amine-terminated resin additional materials, for example an accelerator or catalyst for the subsequent curing reaction. The formulated amine-terminated resin as just described is then comminuted to form a powder.

The second embodiment of the invention involves the formation of an assembly comprising a reinforcement, a powdered solid epoxy-terminated epoxy resin and, as a separate layer, an amine-terminated epoxy resin. Typically, powdered epoxy resin is applied to the reinforcement as described in the previous paragraphs, but the amine terminated epoxy resin is now added as a film on top of the epoxy-terminated epoxy powder. Application of pressure and low heat causes the reactive components to adhere to the reinforcement without fully consolidating. Again, a system that is flexible but low in tack can easily be made.

Whilst epoxies are commonly used for powder coating formulations, such formulations are primarily used for surface coatings on metal, wire etc., and not for applying to fibrous reinforcements. Such applications are typically cured at high temperatures i.e. 150° C. and above.

The present invention will be described further by way of example only and with reference to the following examples and drawings in which.

Figure 1:
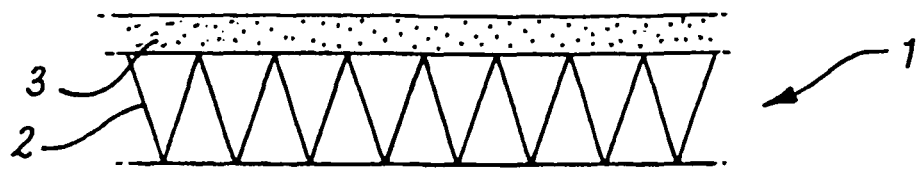
FIG. 1 is a diagrammatic representation of an assembly of the present invention.

FIG. 1 shows an assembly 1 comprising a fibrous reinforcement 2 having a resin material 3 applied to one side thereof so as to form a coating upon the surface of the said reinforcement.

Figure 2:
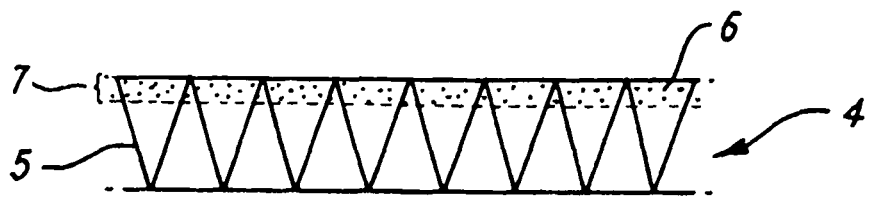
FIG. 2 is a diagrammatic representation of an assembly of the present invention.

FIG. 2 shows an assembly 4 comprising a fibrous reinforcement 5 having resin material 6 applied to one side thereof so as to form a layer at the uppermost peripheral region 7 of the said reinforcement.

Figure 3:
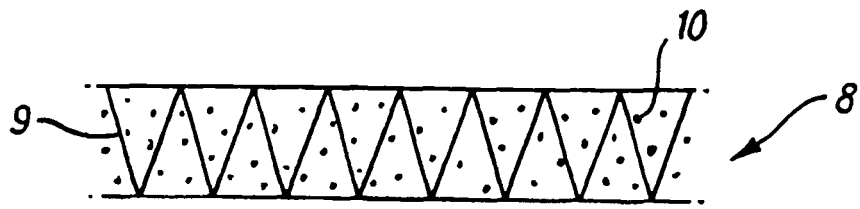
FIG. 3 is a diagrammatic representation of an assembly of the present invention.

FIG. 3 shows an assembly 8 comprising a fibrous reinforcement 9 having a resin material 10 uniformly dispersed therein.

Figure 4:
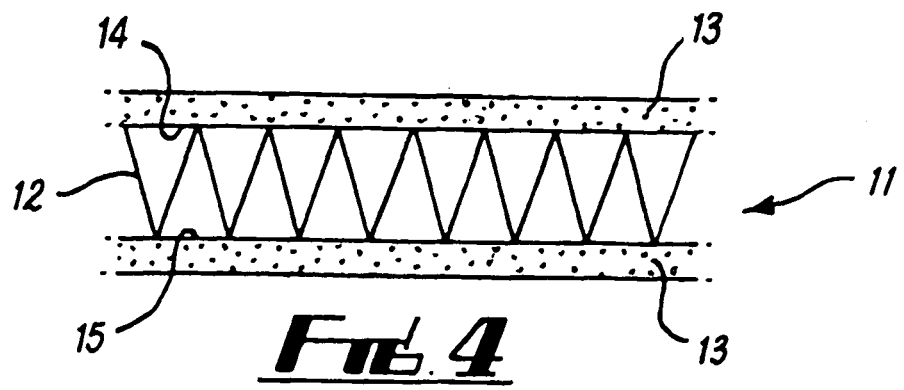
FIG. 4 is a diagrammatic representation of an assembly of the present invention.

FIG. 4 shows an assembly 11 comprising a fibrous reinforcement 12 having a resin material 13 applied to opposite sides 14 and 15 thereof so as to form a coating upon the said sides of the said reinforcement.

Figure 5:
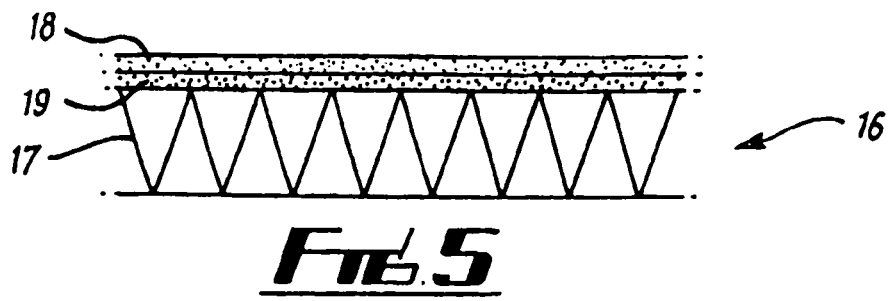
FIG. 5 is a diagrammatic representation of an assembly of the present invention.

FIG. 5 shows an assembly 16 comprising a fibrous reinforcement 17, a layer of resin material comprising epoxy-terminated epoxy resin 18 and a layer of resin material comprising an amine-terminated epoxy resin 19 located therebetween. It is worthy of note that the layers comprising epoxy-terminated and amine-terminated epoxy resins may be transposed.

Figure 6:
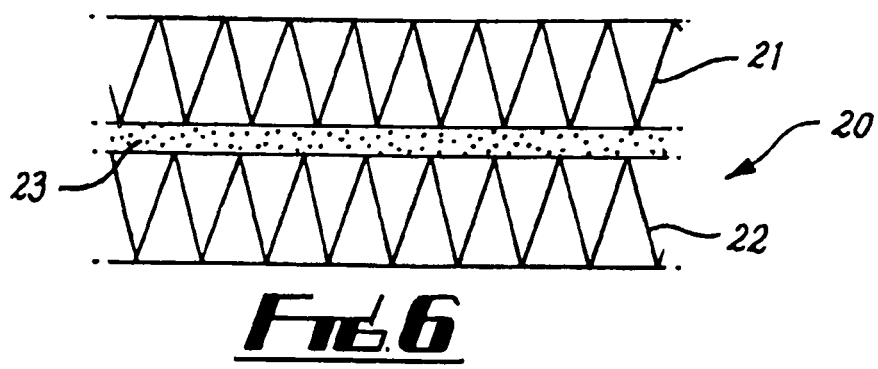
FIG. 6 is a diagrammatic representation of an assembly according to the present invention.

FIG. 6 shows an assembly 20 comprising a first and second reinforcement layers 21 and 22 having a layer of resin material 23 located therebetween.

Figure 7:
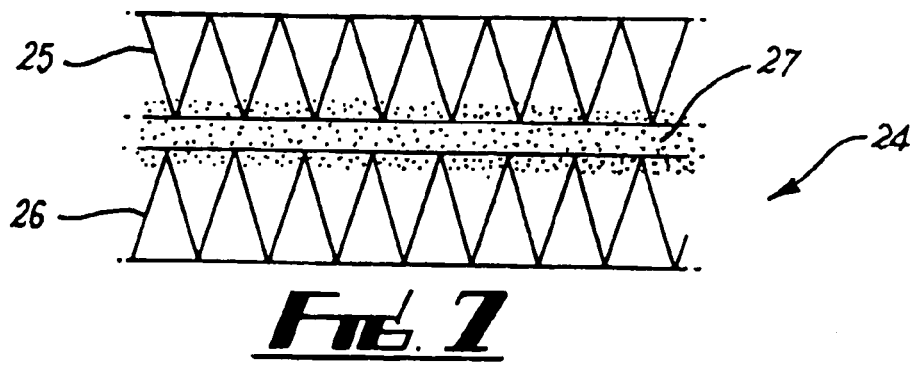
FIG. 7 is a diagrammatic representation of an assembly according to the present invention.

FIG. 7 shows an assembly 24 comprising first and second reinforcement layers 25 and 26 having a layer of resin material 27 located therebetween and wherein the resin material at least partially infuses the fibrous reinforcement layer with which it is contact.

Figure 8:
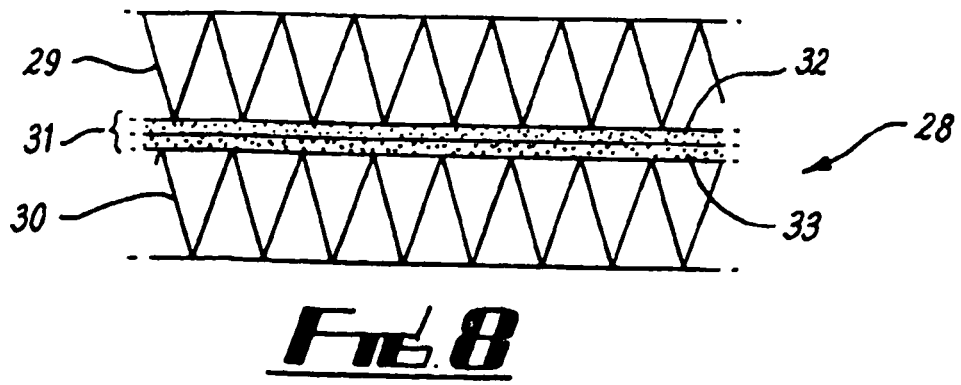
FIG. 8 is a diagrammatic representation of an assembly according to the present invention.

FIG. 8 shows an assembly 28 comprising first and second reinforcement layers 29 and 30 and a resin material 31 located therebetween, said resin material being in the form of first layer 32 comprising epoxy-terminated epoxy resin and a second layer 33 comprising amine-terminated epoxy resin. It is worthy of note that the amine and epoxy resin layers may be transposed and the resin material may be such that the material infuses the fibre reinforcement with which it is in contact.

EXAMPLES

Solid epoxy resins with amino termination were prepared from the following systems:

Preparation 1 Aminoethyl piperazine (15.57 g) From BASF, Cheadle, England plus DER 332 (bisphenol A diglycidyl ether) (20.00 g) from Dow, West Drayton, England Preparation 2 Piperazine (18.7821 g) from BASF plus DER 332 (31.42 g)

The components were mixed together in the bulk state and heated with stirring until reaction occurred. An exotherm of up to 120° C. ensued and following this, the resin was held at 90° C. for 1 hour. Following the reaction of the amine with the epoxy just described, bisphenol A was dissolved in the molten resin at 5 parts per hundred of resin. The resin was cooled to room temperature and ground, then sieved to a particle size of less than 150 µm. The calculated equivalent weight per active hydrogen are 170 g·mol$^{-1}$ for Preparation 1 and 200 g·mol$^{-1}$ for Preparation 2.

Preparation 3 As the epoxy part of the assembly, 80 parts of Araldite ECN 1299 (an epoxy cresol novolak of Huntsman Advanced Materials, Basel, Switzerland) were heated at 90° C. with 20 parts of DER332. The homogeneous mixture was cooled, ground and sieved to 150 µm.

Preparation 4 As a further epoxy powder, 25 parts of semi-solid novolak epoxy resin DEN438 (Dow) and 75 parts Araldite GT6071 (Huntsman) solid epoxy were heated together at 90° C. and thoroughly mixed then cooled, ground and sieved to 300 µm.

Example 1

0.558 g of powder of Preparation 2 and 0.586 g of powder of Preparation 3 were thoroughly mixed and applied evenly to a 5 cm square of 850 gsm stitched UD E-glass fabric (from Chromarat, Le Cheylard, /France). UDE-glass fabric is type 72.00. G100 (720 gm$^2$ glass in UD direction, O g/m$^2$ glass in 90° direction and a glass fleece of 100 g/m$^2$ stitched on the UD). This assembly was held for a few seconds on a hot plate at 50° C. to sinter the powder. The thus prepared tack-free assembly was cured in a pre-heated press at 92° C. for 15 minutes. A good void-free laminate was obtained, for which dynamic mechanical thermal analysis (using a heating rate of 5° C. per minute and an applied frequency of 1.0 Hz) gave a modulus Tg of 90° C.

Example 2

0.893 g of Preparation 1 and 1.0 g of Preparation 3 were thoroughly mixed and applied to glass reinforcement as in Example 1. A good laminate was obtained after curing, modulus Tg of 100° C.

Example 3

1.28 g of powder of Preparation 1 and 2.36 g of Preparation 4 were thoroughly mixed and applied to a piece of 850 gsm glass reinforcement to give an overall resin content of 35%. After briefly warming to 50° C. to sinter the powder on to the reinforcement, the assembly was cured in a press at 91° C. for 15 minutes. A good laminate was obtained, with a modulus Tg of 91° C.

It is of course to be understood that the present invention is described by way of example only and is not intended to be restricted to the above examples.

The invention claimed is:

1. A tack-free uncured assembly for curing at a cure temperature, said uncured assembly comprising:
a fibrous reinforcement layer comprising a fibrous web; and
a sintered material formed by sintering a powdered blend applied to the fibrous reinforcement layer, the powdered blend comprising a powdered amine-terminated epoxy resin of particles comprising an amine-terminated epoxy resin and a powdered epoxy resin of particles comprising an epoxy-terminated epoxy resin, the sintered material being present in the range of 20 to 50 weight percent of the tack-free uncured assembly;
wherein said sintering causes the particles of the powdered amine-terminated epoxy resin and the particles of the powdered epoxy resin to adhere to each other and to the fibrous reinforcement layer, resulting in the tack-free uncured assembly; and
wherein said sintered material is capable of melting and mixing within the fibrous web at said cure temperature.

2. A tack-free uncured assembly according to claim 1 where the powdered amine-terminated epoxy resin is a powdered amine-terminated epoxy resin of particles consisting essentially of an amine-terminated epoxy resin and at least one cure accelerator or catalyst.

3. A tack-free uncured assembly according to claim 2 wherein the at least one cure accelerator or catalyst comprises bisphenol A and/or salicylic acid.

4. A tack-free uncured assembly according to claim 1 where the powdered epoxy resin is a powdered epoxy resin of particles consisting essentially of an epoxy-terminated epoxy resin and at least one cure accelerator or catalyst.

5. A tack-free uncured assembly according to claim 1 wherein the fibrous reinforcement layer comprises a first outer surface and a first peripheral region and wherein the sintered material is located upon said first outer surface and/or in said first peripheral region.

6. A tack-free uncured assembly according to claim 5 wherein the fibrous reinforcement layer further comprises a second outer surface and a second peripheral region, wherein the sintered material is located upon said second outer surface and/or in said second peripheral region.

7. A tack-free uncured assembly according to claim 1 wherein; the powdered amine-terminated epoxy resin is a powdered amine-terminated epoxy resin of particles comprising an amine-terminated epoxy resin and at least one cure accelerator or catalyst; or the powdered epoxy resin is a powdered epoxy resin of particles comprising an epoxy-terminated epoxy resin and at least one cure accelerator or catalyst; or the powdered amine-terminated epoxy resin is a powdered amine-terminated epoxy resin of particles comprising an amine-terminated epoxy resin and at least one cure accelerator or catalyst and the powdered epoxy resin is a powdered epoxy resin of particles comprising an epoxy-terminated epoxy resin and at least one cure accelerator or catalyst.

8. A tack-free uncured assembly according to claim 7 where said at least one cure accelerator or catalyst is selected from the group consisting of tris(dimethylaminomethyl) phenol, dimethylaminomethylphenol, phenol, catechol, resorcinol, pentadecyl phenol, diuron, phenyl urea, bisphenol A, salicylic acid and combinations thereof.

9. A method for making a tack-free uncured assembly for curing at a cure temperature, said method comprising the steps of:
providing a fibrous reinforcement layer comprising a fibrous web;
applying a powdered blend to the fibrous reinforcement layer, the powdered blend comprising a powdered amine-terminated epoxy resin of particles comprising an amine-terminated epoxy resin and a powdered epoxy resin of particles comprising an epoxy-terminated epoxy resin; and sintering the powdered blend, causing the particles of the powdered amine-terminated epoxy resin and the particles of the powdered epoxy resin to adhere to each other and to the fibrous reinforcement layer, resulting in a sintered material and the tack-free uncured assembly;

wherein the powdered blend is provided in an amount such that the resulting sintered material is present in the range of 20 to 50 weight percent of the tack-free uncured assembly; and wherein said sintered material is capable of melting and mixing within the fibrous web at said cure temperature.

10. A method for making a tack-free uncured assembly according to claim 9 where the powdered amine-terminated epoxy resin is a powdered amine-terminated epoxy resin of particles consisting essentially of an amine-terminated epoxy resin and at least one cure accelerator or catalyst.

11. A method for making a tack-free uncured assembly according to claim 10 wherein the at least one cure accelerator or catalyst comprises bisphenol A and/or salicylic acid.

12. A method for making a tack-free uncured assembly according to claim 9 where the powdered epoxy resin is a powdered epoxy resin of particles consisting essentially of an epoxy-terminated epoxy resin and at least one cure accelerator or catalyst.

13. A method for making a tack-free uncured assembly according to claim 9 wherein the fibrous reinforcement layer comprises a first outer surface and a first peripheral region and wherein the powdered blend is applied upon said first outer surface and/or in said first peripheral region.

14. A method for making a tack-free uncured assembly according to claim 13 wherein the fibrous reinforcement layer further comprises a second outer surface and second peripheral region and wherein prior to sintering, the powdered blend is also applied upon said second surface and/or in said second peripheral region.

15. A method for making a tack-free uncured assembly according to claim 9 wherein; the powdered amine-terminated epoxy resin is a powdered amine-terminated epoxy resin of particles comprising an amine-terminated epoxy resin and at least one cure accelerator or catalyst: or the powdered epoxy resin is a powdered epoxy resin of particles comprising an epoxy-terminated epoxy resin. and at least one cure accelerator or catalyst; or the powdered amine-terminated epoxy resin is a powdered amine-terminated epoxy resin of particles comprising an amine-terminated epoxy resin and at least one cure accelerator or catalyst and the powdered epoxy resin is a powdered epoxy resin of particles comprising an epoxy-terminated epoxy resin and at least one cure accelerator or cure catalyst.

16. A method for making a tack-free uncured assembly according to claim 15 wherein said at least one cure accelerator or catalyst is selected from the group consisting of tris (dimethylaminomethyl) phenol, dimethylaminom.ethylphenol, phenol, catechol, resorcinol, pentadecyl phenol, diuron, phenyl urea, bisphenol A. salicylic acid and combinations thereof.

* * * * *